United States Patent
Zhou et al.

(10) Patent No.: US 8,982,700 B1
(45) Date of Patent: Mar. 17, 2015

(54) SYSTEM AND METHOD FOR MINIMIZING HARDWARE RESOURCES FOR GIVEN PERFORMANCE USING WEIGHTED COST MULTI-PATH FLOW DISTRIBUTION

(75) Inventors: Junlan Zhou, Sunnyvale, CA (US); Amin Vahdat, Los Altos, CA (US); Arjun Singh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 600 days.

(21) Appl. No.: 13/359,698

(22) Filed: Jan. 27, 2012

(51) Int. Cl.
 *H04L 12/26* (2006.01)
(52) U.S. Cl.
 USPC ............................ 370/235; 370/229; 709/241
(58) Field of Classification Search
 None
 See application file for complete search history.

(56) References Cited

U.S. PATENT DOCUMENTS

| | | | |
|---|---|---|---|
| 7,898,959 B1 * | 3/2011 | Arad | 370/235 |
| 2009/0307334 A1 * | 12/2009 | Maltz et al. | 709/219 |

OTHER PUBLICATIONS

U.S. Appl. No. 13/358,835.

* cited by examiner

*Primary Examiner* — Jianye Wu
*Assistant Examiner* — Jeff Banthrongsack
(74) *Attorney, Agent, or Firm* — Lerner, David, Littenberg, Krumholz & Mentlik, LLP (57) ABSTRACT

The present technology considers network devices that include forwarding tables having a number of next-hop entries (e.g., egress ports) where it is possible that the egress port utilization can be load balanced using WCMP groups. In a WCMP group, its members are assigned weights representing an amount of data flow to distribute over a plurality of links for a given destination. This disclosure provides systems and methods to distribute weights assigned to members of WCMP groups while achieving a minimum target for network throughput.

22 Claims, 6 Drawing Sheets

SYSTEM AND METHOD FOR MINIMIZING HARDWARE RESOURCES FOR GIVEN PERFORMANCE USING WEIGHTED COST MULTI-PATH FLOW DISTRIBUTION

BACKGROUND

Given the topology of a network, routing determines a path data packets may take from their source to a destination. In this regard, network switches can often provide multiple paths with potentially different maximum bandwidths. For example, a datacenter switch may include a plurality of egress ports used to uplink data entering the switch to its next hop destination. The egress ports can be connected to physical network links, which are capable of handling a number of bits per second (i.e. Kbps, Mbps and Gbps). Alternate paths taken by data packets originating from different nodes in the network can at times create packet collisions. This can be caused when multiple data packets request the same destination. Typically, these collisions can create congestion in the network resulting in higher latency and lower throughput.

SUMMARY

Routing techniques such as Weighted Cost Multi-Path (WCMP) may be employed to avoid network collisions by load balancing data over a plurality of network uplinks. To implement a WCMP group, its members may be replicated in a forwarding table proportionally to their assigned weights. One aspect of the present technology provides a method for reducing consumption of resources in a forwarding table of a first-stage device. The method may comprise identifying one or more original weighted cost multipath (WCMP) groups. Each original WCMP group may comprise a plurality of ports of the first-stage device, which may have assigned weights for distribution of data to a plurality of second-stage devices. The method may further comprise determining, using a processor, a percentage of data throughput corresponding to the original WCMP group, determining a threshold value for throughput degradation and determining for each original WCMP group, using the processor, a skinny WCMP group. In each skinny WCMP group weights may comprise a substantially proportionate reduction of the assigned weights of the original WCMP group such that a degree of throughput degradation corresponding to the reduction of weights does not exceed the threshold value. In one aspect, determining a skinny WCMP group may further comprise reducing the assigned weights to an equal distribution, computing the throughput degradation corresponding to the reduction to an equal distribution and determining whether the computed throughput degradation corresponding to the reduction to an equal distribution exceeds the threshold value.

Another aspect of the present technology provides a system for reducing consumption of resources in a forwarding table of a first-stage device. The system may include a processor and a memory accessible by the processor. In the system, the memory may store instructions executable by the processor. The instructions may identify one or more original weighted cost multipath (WCMP) groups. Each original WCMP group may comprise a plurality of ports of the first-stage device, which may have assigned weights for distribution of data to a plurality of second-stage devices. The system may further include instructions for determining, using a processor, a percentage of data throughput corresponding to the original WCMP group, determining a threshold value for throughput degradation and determining for each original WCMP group, using the processor, a skinny WCMP group. For each skinny WCMP group weights a determination may be made for a substantially proportionate reduction of the assigned weights of the original WCMP group such that a degree of throughput degradation corresponding to the reduction of weights does not exceed the threshold value. In one aspect, determining a skinny WCMP group may further comprise reducing the assigned weights to an equal distribution, computing the throughput degradation corresponding to the reduction to an equal distribution and determining whether the computed throughput degradation corresponding to the reduction to an equal distribution exceeds the threshold value.

Yet another aspect of the present technology provides a system comprising at least one first stage network device, wherein each of the at least one first stage devices may include a forwarding table. The system may further comprise a plurality of second stage network devices. Each of the at least one first stage network devices may include a plurality of ports, wherein each port may be linked to at least one of the plurality of second stage network devices. Each port of the first stage device may further include an assigned weight stored in the forwarding table for distribution of flows to the plurality of second stage network devices. The assigned weights may be determined by determining a distribution of assigned weights among the ports that would result in maximum potential throughput of the flows, determining a minimum desired throughput and determining a reduced set of assigned weights, such that a throughput resulting from the reduced set of assigned weights exceeds the minimum desired throughput.

DETAILED DESCRIPTION

Aspects, features and advantages of this disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

The present technology considers network devices that include forwarding tables having a number of next-hop entries (e.g., egress ports) where it is possible that the egress port utilization can be load balanced using WCMP groups. In a WCMP group, group members are assigned weights representing an amount of data flow to distribute over a plurality of links for a given destination.

In this disclosure, systems and methods are provided to distribute weights assigned to members of a WCMP group while achieving a minimum target for network throughput. To implement a WCMP group, its members may be replicated in a forwarding table proportionally to their assigned weights. For example, in a network device that has 8 egress ports, a WCMP group configuration may be wcmp_group: 95 95 94 94 94 94 95 95. In this example, for every 95 flows assigned to be distributed to a first and second egress port, 94 may be distributed to a third, fourth, fifth and sixth, and 95 may be distributed to the seventh and eight egress ports. Thus, the aggregate total of forwarding table entries to establish this ratio may be 95+95+94+94+94+94+95+95=756. According to aspects of the present technology, this load balancing ratio may be distributed amongst the WCMP group members to reduce the number of forwarding entries used while maintaining a minimum throughput guarantee.

In some circumstances, traffic flows may be load balanced among WCMP group members according to a set of weights to achieve 100% throughput. To achieve improved network performance in case of uneven striping or failures in the network, more flows may be sent to some egress ports than others, thus weighting some ports more than others, resulting in WCMP flow distribution. For example, WCMP flow distribution is described in commonly owned, co-pending U.S. patent application Ser. No. 13/358,835 filed Jan. 26, 2012 and entitled "MULTI-STAGE SWITCHING TOPOLOGY", the disclosure of which is incorporated by reference as if fully set forth herein.

Figure 1:
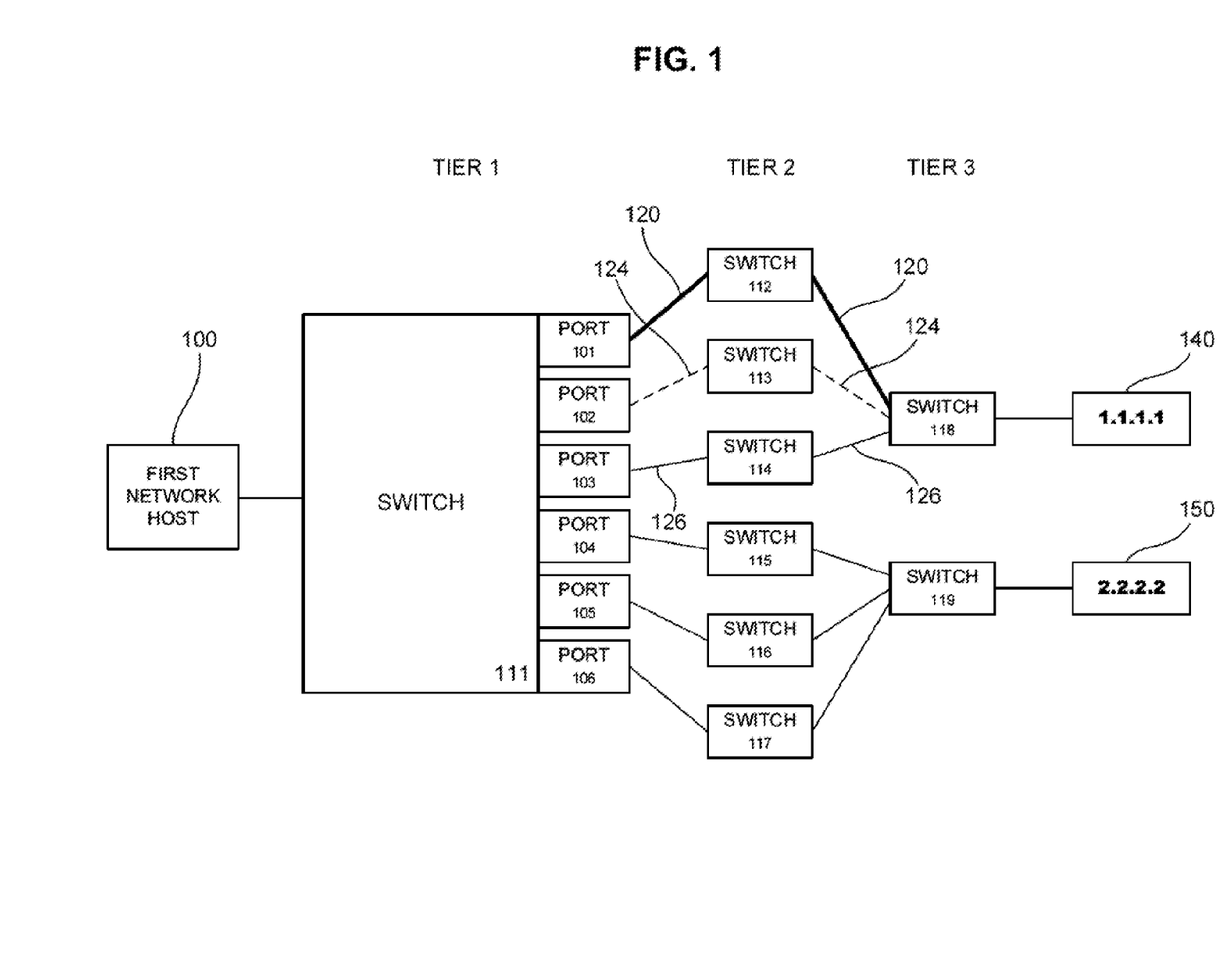
FIG. 1 is a schematic diagram of a multi-stage network according to aspects of the technology.

FIG. 1 is a schematic diagram of a multi-stage network 100 according to aspects of the technology. As shown, the network 100 comprises a first stage switch 111 (Tier 1) and a second stage (Tier 2) including a plurality of switches 112-117, and a third stage (Tier 3) including a second plurality of switches 118, 119. While only a few switches 111-119 are shown, it should be understood that network 100, may be expanded to include a number of switches to accommodate greater amounts of network traffic. For example, each of the Tier 3 switches 118, 119 may be coupled to one or more host devices 140, 150 such as network servers or other computing devices. Each Tier 2 switch 112-117 may further be coupled to one or more of the Tier 3 switches 118, 119.

Each switch 111-119 may include a predetermined number of data ports. The number of data ports may vary depending on, for example, a type of switch used and may be proportional to a cost of the switch. Some ports may be dedicated to downlink traffic (e.g., from Tier 2 switches to Tier 1 switches, or from Tier 1 switches to a first device 100), while others may be dedicated to uplink traffic (e.g., from Tier 1 switches to Tier 2 switches, or from Tier 2 switches to other network devices). Alternatively or additionally, some ports may be dedicated to ingress while others are dedicated to egress. The number of data ports may also dictate the number of links that may be established with other network devices. For example, Tier 1 switch 111 may have 16 data ports for uplink traffic, and thus 16 links may be established between the switch 111 and the Tier 2 switches 112-117.

In FIG. 1 switches 111-119 are illustrated as being connected to each other and thereby forming a portion of network 100. In this example, switch 111 has 6 egress ports having a number of paths to destination hosts at IP address 1.1.1.1 and 2.2.2.2. Each path may be composed of physical links having different bandwidth. For example, a first path 120 to server 1.1.1.1 may provide data transport speeds of up to 3 gigabits per second, a second path 124 to server 1.1.1.1 may provide data transport speeds of up to 2 gigabits per second and a third path 26 to server 1.1.1.1 may provide data transport speeds of up to 1 gigabit per second. Data originating from a first network device 100 may be, for example, designated to reach destination hosts 140, 150 by specifying IP address 1.1.1.1 or 2.2.2.2. Traffic destined to these addresses may be distributed among the paths in a weighted manner proportional to their respective capacities.

A forwarding table may be present at every switch 111-119 in the network 100. The forwarding table may store information about the IP destinations. Each table may contain a series of default entries according to the configuration of the switch, and additional entries can be added manually, for example by administrators that use TCP/IP tools, or automatically, when switches listen for routing information messages sent possibly by routers. It should be understood that switches 111-119 could be routers, bridges, or other types of devices capable of receiving packets at a first port and transmitting the packets through a second port.

Figure 2:
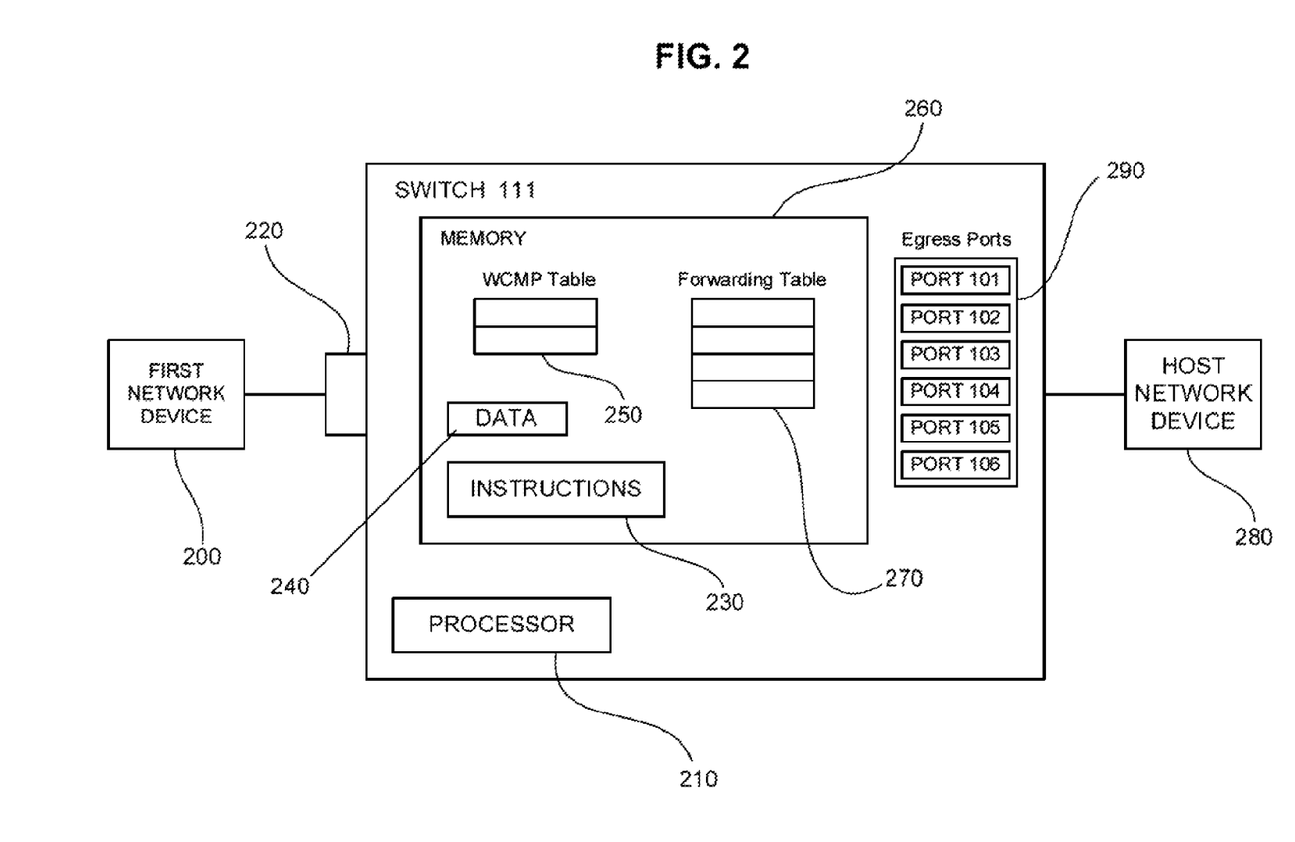
FIG. 2 is a block diagram that depicts a network switch according to aspects of the technology.

FIG. 2 is a block diagram that depicts a network switch 111 according to aspects of the technology. As shown, switch 111 comprises memory 260, including data 240 and instructions 230, and a processor 210 coupled to the memory 260. The switch may further comprise a number of potential egress ports 290 for data that entered the switch 111 through one or more ingress ports 220 from an originating first network device 200.

The memory 260 stores information accessible by processor 210, including the instructions 230 and data 240 that may be executed or otherwise used by the processor 210. The memory 260 may be of a type capable of storing information accessible by the processor 210, including a non-transitory computer-readable medium, or other tangible computer-readable mediums that store data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 230 may be a set of instructions to be executed directly (such as machine code) or indirectly (such as scripts) by the processor 210. For example, the instructions may be stored as computer code on the computer-readable medium. In that regard, the terms "instructions" and "programs" may be used interchangeably herein. The instructions may be stored in object code format for direct processing by the processor, or in other computer languages including scripts or collections of independent source code modules that are interpreted on demand or compiled in advance. Functions, methods and routines of the instructions are explained in more detail below.

The data 240 may be retrieved, stored or modified by processor 210 in accordance with the instructions 230. For instance, although the system and method is not limited by a particular data structure, the data may be stored in computer registers, in a relational database as a table having a plurality of different fields and records, XML documents or flat files. The data may also be formatted in a computer-readable format. The data 240 may comprise information sufficient to identify the relevant information, such as numbers, descriptive text, proprietary codes, references to data stored in other areas of the same memory or different memories (including other network locations) or information that is used by a function to calculate the relevant data.

The processor 210 may be a conventional processor, such as processors found in commercially available routers. Alternatively, the processor may be a dedicated controller such as an ASIC, FPGA or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The switch 111 may also include one or more tables such as forwarding table 270 and WCMP table 250. The switch 111 may further comprise a plurality of egress ports 290, which may be used to forward information to a next hop, such as a host network device 280. Although only one host device 280 is shown, the switch 111 may be coupled to a number of hosts 280 or other network devices. For example, the egress ports 290 may be linked to a different host device, or several egress ports 290 may be linked to a single device.

The forwarding table 270 may include a number of entries, each listing an egress port. As packets are received by switch 111, header information in those packets may be matched against keys of the forwarding table to determine a corresponding egress port (e.g., a next hop). The WCMP table 250 may, for example, include a weighting of each egress port 290 on switch 111, and may be used to determine which port (e.g., which egress data port) the packet should be transmitted through. While the forwarding table 270 and WCMP table 250 are shown as being stored together in the memory 260, it should be understood that the forwarding table 270, WCMP table 250, data 240, and instructions 230 may all be stored in separate non-transitory mediums of the switch 111.

Figure 3:
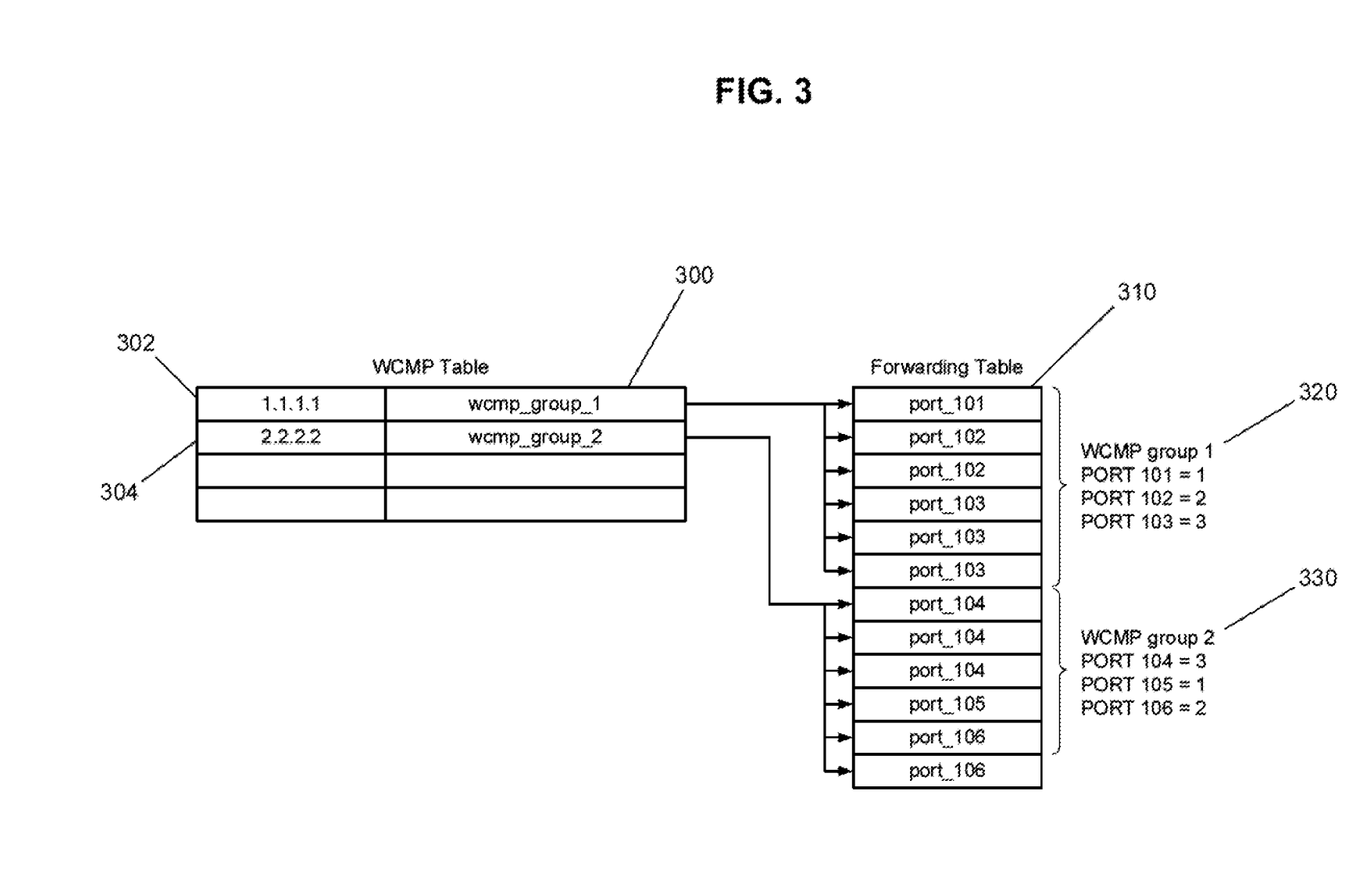
FIG. 3 is a diagram that illustrates a forwarding table and a WCMP table configured according to aspects of the technology.

FIG. 3 is a diagram that illustrates a forwarding table 310 and a WCMP table 300 configured according to aspects of the technology. Load balancing flows of data packets through a network device may be managed, for example, using forwarding tables 310 and WCMP tables 300. As shown, WCMP tables 300 may include a number of entries representing WCMP groups 302, 304. As discussed above, to implement a WCMP group, its member entries may be replicated in a forwarding table proportionally to their assigned weights.

Each entry of the WCMP table 300 may have a key and an action. The key may comprise a number of bits representing, for example, a destination address. The action may comprise information representing a group of egress ports for distributing packets over that match the key. The forwarding table 310 may include a plurality of entries 320, 330 with each entry identifying an egress port through which received packets may be forwarded. The number of entries listing a particular port may vary depending on a weight assigned to the port. For example, entry 302 in the WCMP table 300 indentifies a destination address 1.1.1.1 of the destination host 102 (See FIG. 1). As shown in FIG. 1, the destination host 140 is coupled to the switch 111 through switches 112-114 and 118. Because the switches 112-114 are linked to ports 101-103, data addressed to the host device 120 may be distributed among those ports 101-103 in a weighted proportion.

Referring back to FIG. 3, port 101 may be assigned a weight of 1, port 102 may be assigned a weight of 2, and port 103 may be assigned a weight of 3, such weighting may be determined by an amount of bandwidth that can be handled by each physical connection between ports 101-103. As discussed, load balancing traffic flows may require the replication of forwarding table entries 320,330 with each storing an identification of a member port corresponding to a WCMP group. Accordingly, entry 302 may have a total of six entries 320 in the forwarding table 310. Similarly, entry 304 in WCMP table 300 may have a number of entries 330 in forwarding table 310 for distributing traffic.

In addition to the elements described above, system and methods according to aspects for the technology will now be described. While the systems and methods may include various stages, which are described below in a particular order, it should be understood that the sequence of the stages might be varied. In addition, stages may be omitted and/or additional stages may be added.

Figure 4:
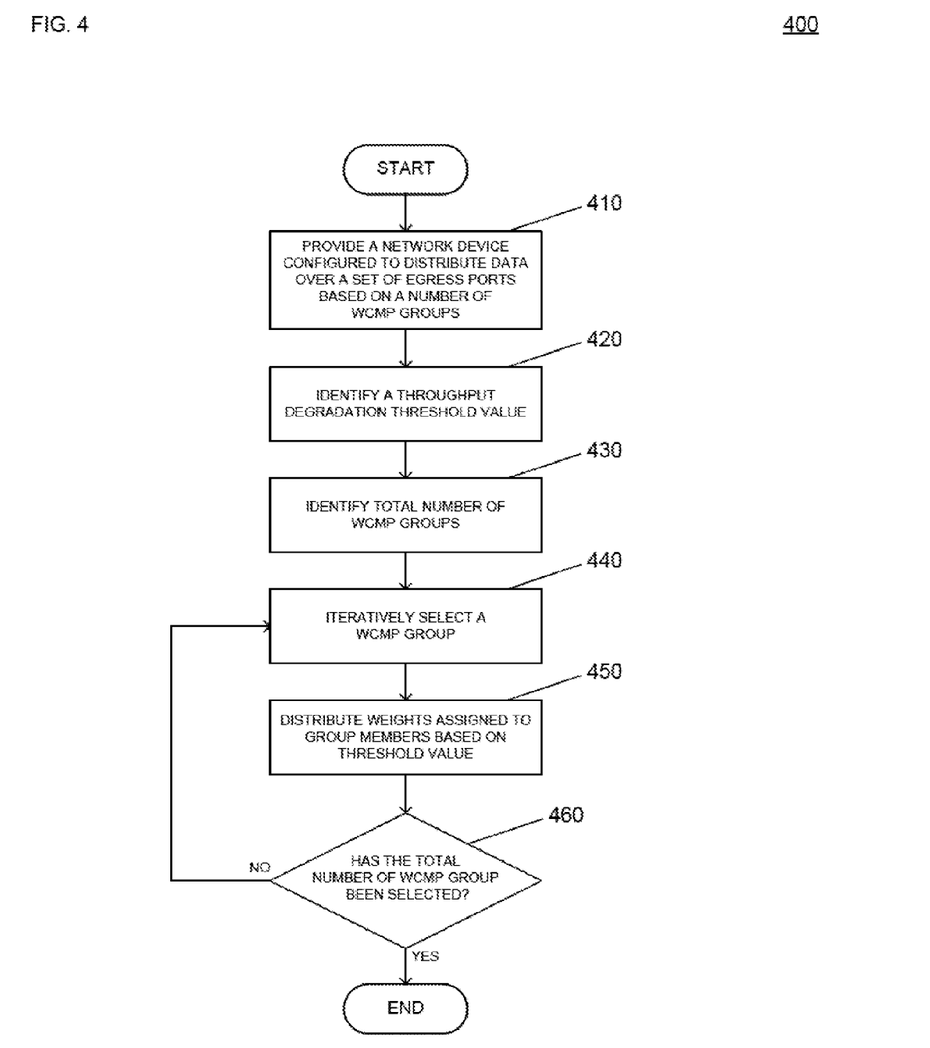
FIG. 4 illustrates a flow diagram of a method for distributing resources of a network device while achieving a minimum target for network throughput according to an aspect of the present technology.

FIG. 4 illustrates a flow diagram of a method for distributing resources of a network device while achieving a minimum target for network throughput according to an aspect of the present technology. The method 400 is described with reference to a source/destination pair of host devices, such as the host devices 100, 140 and 150 (See FIG. 1). However, it should be understood that the operations discussed in connection with method 400 may be applied to a pairing of network devices, including switches, backplanes, etc.

At stage 410, a network device is provided, such as switch 111 illustrated in FIG. 1. The network device may be configured to distribute data packets over a set of egress ports based on a weighted distribution. Multiple paths may exist between the network device and other destination hosts to which data packets are forwarded over time. In this regard, load balancing may be implemented on the device using WCMP groups in a manner that can minimize packet collisions.

At stage 420, a threshold value may be configured to indicate a maximum amount traffic throughput degradation allowed in a particular embodiment of method 400. For example, a maximum throughput degradation value may be 10%, and thus a minimum acquired throughput may be 90%. Network throughput may be measured by averaging a rate of successful messages delivered over a communication channel. For example, data passing over a physical or logical link, or passing through a certain network node can be measured in bits per second (bit/s or bps), and sometimes in data packets per second or data packets per time slot. Typically, degradations in throughput performance can be due to uneven striping or failures in the network.

At stage 430, a total number of WCMP groups included in a network device may be identified. As discussed above, a WCMP group may be used in a routing technique where group members are assigned weights representing an amount of data flow to distribute over a plurality of uplinks. For example, in a network device that has 8 egress ports, a WCMP group configuration may have 8 members with each member representing an egress port. A network device may include a plurality of WCMP groups stored in memory. The configuration of WCMP groups could be designed to obtain an optimum network throughput performance. As an illustrative example, a network device may include the following WCMP groups:

Original wcmp groups
    wcmp_group1: 28 29 29 29 29 28 28 28
    wcmp_group2: 110 74 52 46 48 90 82 73
    wcmp_group3: 84 56 118 288 342 34 82 73
    wcmp_group4: 340 234 134 32 45 67 82 73
    wcmp_group5: 67 66 68 69 70 69 69 69
    wcmp_group6: 97 97 98 98 98 97 97 97
    wcmp_group7: 100 45 56 32 67 98 98 87
    wcmp_group8: 200 122 134 300 101 99 39 99

In this example, there are a total of 8 WCMP groups that may be identified for processing.

At stage 440, each WCMP group may be selected one at a time. For example, wcmp_groups1-8 can be organized into a list of nodes (e.g., a linear linked list). The fields of each node of the list could comprise a pointer to a WCMP group and an address of the next node in the list. Starting with a first node of the list and working through to the remaining nodes in successive order, each WCMP group pointer associated with a current node may be selected for further processing.

At stage 450, weights assigned to members of a selected WCMP group may be recalculated and reduced in proportion to other group members to achieve a new "skinny" group. The reduction may be made while achieving a minimum target for network throughput. According to aspects, a selected WCMP group may be maximally reduced to an equal distribution of weights. For example, reducing wcmp_group1 from the example above to an equal distribution of weights may result in a configuration such as wcmp_group1 1 1 1 1 1 1 1. It should be appreciated that by reducing the weights assigned members of a WCMP group, network throughput may decrease due to, for example, increased collisions in the network.

Because of the possible effects to network performance incurred by maximally reducing the WCMP group, the throughput degradation may be calculated during stage 450. If the calculated throughput degradation of the new skinny WCMP group is below the threshold value, then members of the selected WCMP group may be assigned the equal distribution of weights. Otherwise, each member's weight may be gradually increased, in a number of iterations, until the throughput degradation falls below the threshold value. For example, if a WCMP group has been initialized to an equal distribution of weights (e.g., wcmp_group 1 1 1 1 1 1 1 1) and the calculated throughput degradation is above the threshold then the member weights are gradually increased. In the next iteration, members in the group may be proportionally increased (e.g., wcmp_group 2 1 1 1 1 2 2 2). If the throughput degradation is still above the threshold value, group member weights will be gradually increased again and again until the threshold value has been met.

At stage 460, testing may be performed to determine whether the total number of WCMP groups has been analyzed. If the total number of WCMP groups has not been reached, then method 400 may return to stage 440 to select another WCMP group to process. Otherwise, method 400 may stop. After processing the WCMP groups, their aggregate size may have decreased because the respective group member weights may have shrunk. The aggregate size can be determined by calculating a sum of the member weights of the WCMP groups (e.g., in the listing given above the aggregate size of the Original_wcmp_groups would be approximately 4813). This total may correspond to the number of forwarding table entries necessary to implement the WCMP groups. Thus, a reduction in the aggregate size of the WCMP groups decreases the amount of resources needed to implement the groups.

According to some aspects, method 400 may be described in a pseudo-code statement as follows:

```
ReduceWcmpGroups (S, δ_max)
{
   For i in [0..Y]
   {
      ReduceOneWcmpGroup(S[i], new_wcmp_group, δ_max);
      S[i] = new_wcmp_groups;
   }
}
```

S[i]: stores the iTH wcmp group.
Y: total number of WCMP groups
$\delta_{max}$: the maximum acceptable throughput degradation In the pseudo code above, $\delta_{max}$ represents the maximum acceptable throughput degradation allowed in an embodiment of method 400. For example, if $\delta_{max}$ is set to 1.006, then the maximum acceptable throughput degradation will be approximately 0.6%. According to aspects of this disclosure, selected WCMP groups of a network device may be passed to a function ReduceOneWcmpGroup, which is described in pseudo code below. ReduceOneWcmpGroup takes an original WCMP group, distributes weights amongst its members, and returns a reduced set of WCMP group members that may be able to handle traffic flows comparably to the originally selected WMCP group within a 0.6% tolerance.

Figure 5:
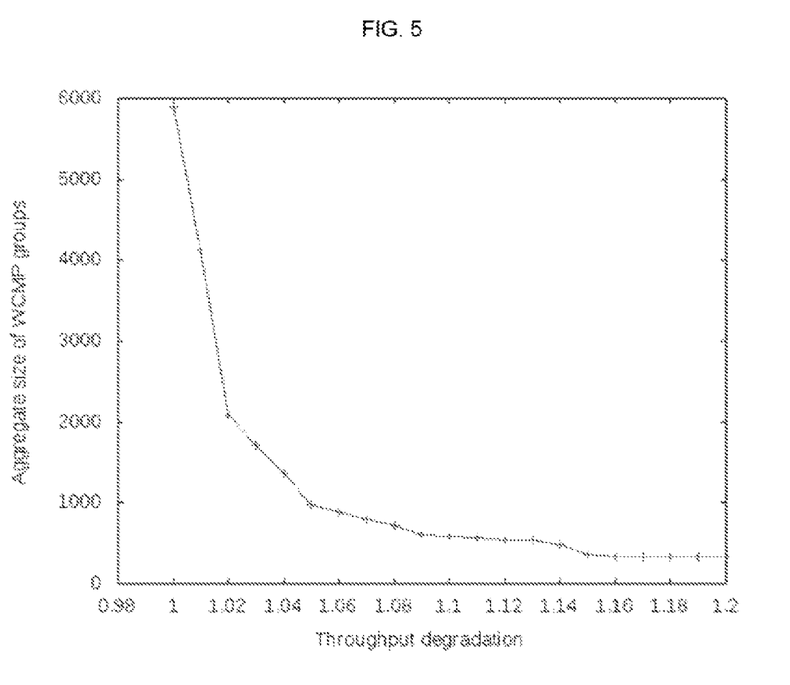
FIG. 5 is a graph illustrating network throughput degradation resulting from a size reduction in WCMP groups.

FIG. 5 is a graph illustrating network throughput degradation resulting from a size reduction in WCMP groups. In FIG. 5, the Y-axis represents an aggregate size of WCMP groups configured in a network device and the X-axis represents the throughput efficiency of a network on which the device is located. The graph plots the aggregate size of the WCMP groups versus throughput degradation. As shown, an initial aggregate size of the WCMP groups (e.g. 6000) may yield an optimal network performance (e.g., 100%). After which, successive decreases in the aggregate size of the WCMP groups may gradually increase throughput degradation (e.g., greater collisions in the network). For example, an initial small degradation in network throughput may yield a large reduction in aggregate WCMP size. As illustrated in FIG. 2, when network throughput degradation increases from x-tick 1 to x-tick 1.02 (e.g., a 0.02% oversubscription) the aggregate size of WCMP groups may reduce threefold, e.g., from 6000 to 2000 members. However, towards a far right of the graph, further degradation in network throughput may give diminishing returns in reduction to the aggregate WCMP group size.

Figure 6:
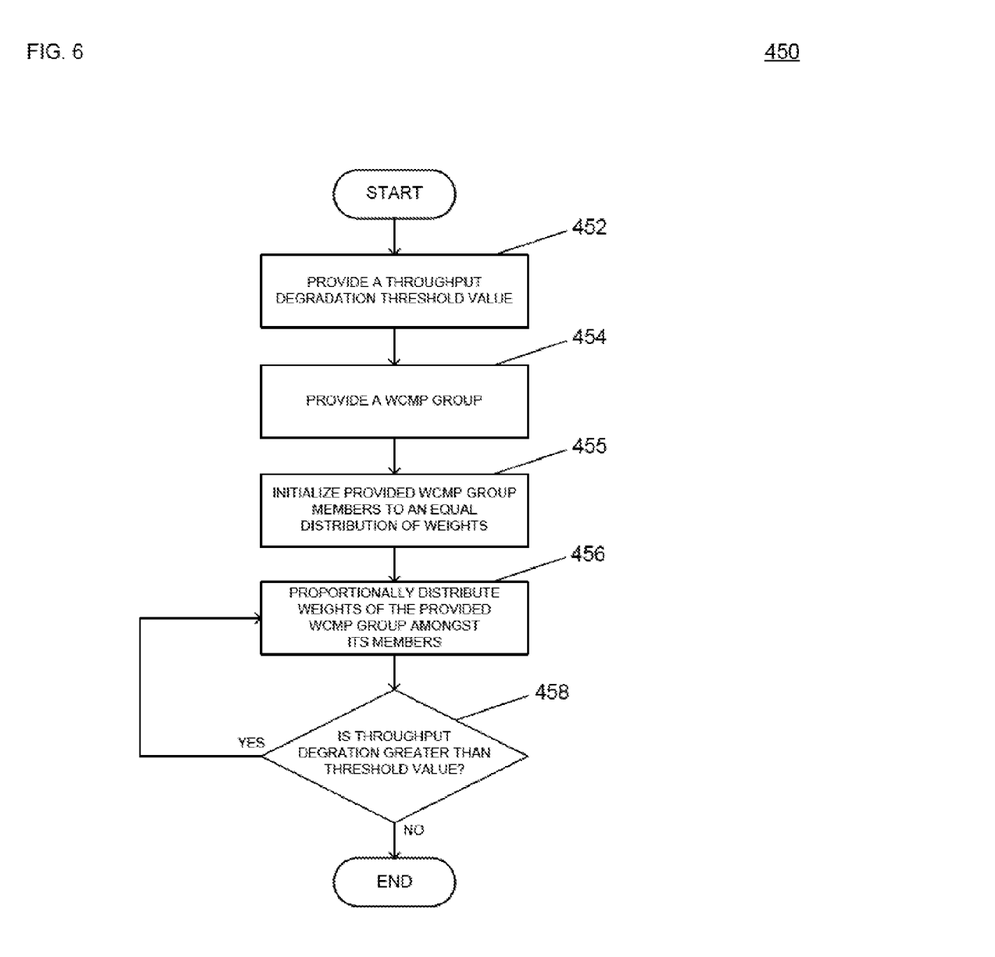
FIG. 6 illustrates a flow diagram of a method for distributing weights assigned to a WCMP group while achieving a minimum target for network throughput according to an aspect of the present technology.

FIG. 6 illustrates a flow diagram of a method 450 for distributing weights assigned to a WCMP group while achieving a minimum target for network throughput according to an aspect of the present technology. This flow diagram may be used, for example, to implement stage 450 of method 400.

The threshold value indentified at stage 420 may be provided in stage 452. The threshold value may be configured to indicate a maximum amount of traffic throughput degradation allowed in a particular embodiment of method 400. For example, a maximum throughput degradation value may be 10%, and thus a minimum acquired throughput may be 90%. In some aspects, the threshold value may be passed to stage 452, for example, as a data structure consisting of a numerical value.

At stage 454, the selected WCMP group from 440 may also be provided. A WCMP group may be employed on a network device to alleviate network collisions by load balancing data dispatched through the device. As discussed above, the WCMP group members can be assigned weights representing an amount of data flow to distribute over a plurality of links for a given destination. In some aspects, the WCMP group may be passed to stage 452, for example, as a data structure consisting of a pointer to a WCMP group.

At stage 455, the selected WCMP may be initialized to an equal distribution of weights. For example, an equal distribution of weights may be when each group member is assigned a weight of 1. The weight of each member of a selected WCMP group may be proportionally increased at stage 456. For example, in a number of iterations, the size of each WCMP group member may be gradually increased as much as possible until the throughput degradation reaches the provided threshold value.

At stage 458, the throughput degradation level may be continually tested. While the throughput degradation is greater than the provided threshold value, the method may repeat stage 456. Otherwise, method 400 may stop.

In some aspects, distributing member weights of a WCMP group may, for example, be represented by the following equation:

$$W_i(G')=1+\text{floor}((W_0(G')-1)*W_i(G)/W_0(G))$$

In the equation above, W represents a weight assigned the iTH member of a provided WCMP group, G represents an original WCMP group with k member ports, G' represents the newly reduced WCMP group, and floor represents a mathematical function which provides a greatest integer by discarding fractional results. According to some aspects, the throughput degradation of the iTH member of G with weight $W_i(G)$ may be proportional to $W_i(G)/W_i(G')$. Thus, to ensure uniform throughput degradation across the members in G, the increment of the iTH member weight $(W_i(G))-1$ is kept proportional to $W_i(G)$. It should be noted that in the above equation $W_0(G)$ may represent a member of group G that has the largest weight in the group. In one aspect this member may be initially incremented by one.

The throughput degradation incurred by reducing WCMP group G to G' may be represented by the following equation:

$$\Delta(G:G')=\max(\delta_k(G')/\delta_k(G)) \, 1 \le k \le N$$

In this equation, $\delta_k(G)$ represents a maximum amount of traffic to be scheduled over member port k of the WCMP group G, $\delta_k(G')$ represents a maximum amount of traffic to be scheduled over member port k of the new reduced WCMP group G', and max represents a mathematical function that yields a largest number from a provided set of numbers. The maximum amount of traffic to be scheduled $\delta_k(G')$ and $\delta_k(G)$ may be calculated using the following equation:

$$\delta_k(G) = D * W_k(G) \Big/ \sum_{i=1}^{N} W_i(G)$$

In this equation, D represents the maximum amount of traffic demand to be spread among N members of the provided WCMP group G, $W_i(G)$ represents the weight assigned to each member i of the WCMP group G, and $W_k(G)$ represents the weight assigned to each member k of the WCMP group G.

In one aspect, the method for reducing a WCMP group may be described in a pseudo-code statement as follows:

```
ReduceOneWCMPGroup (G, G' δmax)
{
    // First minimize the size of G' by initializing it to
    // an ECMP group
    For i in [0..K]
        Wi (G' ) = 1;
    If Δ (G:G' ) <= δmax
        return;
    // Gradually increase the size of G' until the
    // throughput degradation falls below δmax
    While Δ (G:G' ) > δmax
    {
        For i in [0..K]
        {
            If (i == 0)
                W0(G)++;      // Increment the weight with the largest
                              // original value by 1
            Else   // Increase the other member weights
                   // proportionally
                Wi (G') = 1 + floor ( (W0 (G') − 1) * Wi (G) / W0 (G) )
        }
        // Divide each member weight by LCD(G')
        // LCD(G'):  is the largest common denominator
        //          of all member weights of G
        For i in [0..K−1]
            Wi (G') = Wi (G') / LCD(G')
    }
}
```

G: the original wcmp group with K member ports
G': the new scaled down wcmp group with throughput degradation no higher than $\delta_{max}$
$\delta_{max}$: the maximum acceptable throughout degradation In the pseudo-code statement above, while the throughput degradation Δ(G:G') is greater than the provided threshold value (e.g., 0.6% oversubscription) the size of a selected WCMP group may continue to be scaled in the next iteration. In one aspect, the largest common denominator of the member weights of a selected WCMP represented by function LCD(G') may be used to further scale member weights. If throughput degradation falls below the threshold value in a particular iteration, then the reduced WCMP group G' from the previous most recent iteration will be returned.

The above-described aspects of the technology may be advantageous in providing weighted load balancing of multi-stage networks. By distributing weights assigned to a WCMP group thereby reducing a number of resources (e.g. forwarding table entries) required to implement weighted load balancing, fewer packets may be dropped, and network hardware storage limitations can be overcome. Additionally, these techniques may be utilized to shorten setup times in configuring network equipment.

Although the present technology has been described with reference to particular aspects, it should be understood that these examples are merely illustrative of the principles and applications of the technology. For example, it should be understood that the described method may be implemented over a network, such as the Internet, or other types of private networks connected through a router. For example, the network may be a virtual private network operating over the Internet, a local area network, or a wide area network. Additionally, it should be understood that numerous other modifications may be made to the illustrative embodiments. However, these and that other arrangements may be devised without departing from the spirit and scope of the present invention as defined by the appended claims.

The invention claimed is:

1. A method for reducing consumption of resources in a forwarding table of a first-stage device, comprising:
    identifying one or more original weighted cost multipath (WCMP) groups, each original WCMP group comprising a plurality of ports of the first-stage device having assigned weights for distribution of data to a plurality of second-stage devices;
    determining, using a processor, a percentage of data throughput corresponding to the original WCMP group;
    determining a threshold value for throughput degradation; and
    determining for each original WCMP group, using the processor, a skinny WCMP group, wherein the skinny WCMP group comprises a substantially proportionate reduction of the assigned weights of the original WCMP group such that a degree of throughput degradation corresponding to the reduction of weights does not exceed the threshold value.

2. The method of claim 1, wherein the assigned weights of the original WCMP group correspond to a maximum potential throughput.

3. The method of claim 1, wherein determining a skinny WCMP group further comprises:

reducing the assigned weights to an equal distribution;
computing the throughput degradation corresponding to the reduction to an equal distribution; and
determining whether the computed throughput degradation corresponding to the reduction to an equal distribution exceeds the threshold value.

4. The method of claim 3, wherein if the computed throughput degradation corresponding to the reduction to an equal distribution does not exceed the threshold value, the equal distribution is used as the skinny WCMP group.

5. The method of claim 3, wherein if the computed throughput degradation corresponding to the reduction to an equal distribution exceeds the threshold value, the method further comprises iteratively increasing the assigned weights until a computed throughput degradation corresponding to the increased weights falls below the threshold value.

6. The method of claim 5, wherein the iteratively increasing the assigned weights comprises:
incrementing a member weight having a largest original value by 1;
increasing other member weights proportionally; and
dividing each member weight by a largest common denominator of all member weights.

7. The method of claim 6, wherein increasing the other member weights proportionally comprises using the equation:

$$W_i(G')=1+\text{floor}((W_0(G')-1)*W_i(G)/W_0(G))$$

where W is a weight assigned the iTH member of a given WCMP group, G is the original WCMP group, and G' is the skinny WCMP group with a throughput degradation below the threshold value.

8. The method of claim 1, wherein determining a threshold value for throughput degradation comprises using the following equation:

$$\Delta(G:G')=\max(\delta_k(G')/\delta_k(G)) 1 \leq k \leq N$$

where G is the original WCMP group, G' is the skinny WCMP group with a throughput degradation below the threshold value, N is the number of members in WCMP group G, k is a member port, and $\delta_1$, is a maximum amount of traffic to be scheduled over member port k.

9. A system for reducing resources in a forwarding table of a first-stage device, comprising:
a processor; and
a memory accessible by the processor, the memory storing instructions executable by the processor, the instructions comprising:
identifying one or more weighted cost multipath (WCMP) groups, each WCMP group comprising a plurality of ports of the first-stage device having assigned weights for distribution of data to a plurality of second-stage devices;
determining, using a processor, a percentage of data throughput corresponding to the assigned weights of the WCMP group ports;
determining a threshold value for throughput degradation; and
determining for each WCMP group, using the processor, a skinny WCMP group, wherein the skinny WCMP group comprises a substantially proportionate reduction of the assigned weights such that a degree of throughput degradation corresponding to the reduction of weights does not exceed the threshold value.

10. The system of claim 9, wherein the assigned weights of the original WCMP group correspond to a maximum potential throughput.

11. The system of claim 9, wherein determining a skinny WCMP group further comprises:
reducing the assigned weights to an equal distribution;
computing the throughput degradation corresponding to the reduction to an equal distribution; and
determining whether the computed throughput degradation corresponding to the reduction to an equal distribution exceeds the threshold value.

12. The system of claim 11, wherein if the computed throughput degradation corresponding to the reduction to an equal distribution does not exceed the threshold value, the equal distribution is used as the skinny WCMP group.

13. The system of claim 11, wherein if the computed throughput degradation corresponding to the reduction to an equal distribution exceeds the threshold value, the method further comprises iteratively increasing the assigned weights until a computed throughput degradation corresponding to the increased weights falls below the threshold value.

14. The system of claim 13, wherein the iteratively increasing the assigned weights comprises:
incrementing a member weight with a largest original value by 1;
increasing other member weights proportionally; and
dividing each member weight by a largest common denominator of all member weights.

15. The system of claim 14, wherein increasing the other member weights proportionally comprises using the equation:

$$W_i(G')=1+\text{floor}((W_0(G')-1)*W_i(G)/W_0(G))$$

where W is a weight assigned the iTH member of a given WCMP group, G is the original WCMP group, and G' is the skinny WCMP group with a throughput degradation below the threshold value.

16. The system of claim 9, wherein determining a threshold value for throughput degradation comprises using the following equation:

$$\Delta(G:G')=\max(\delta_k(G')/\delta_k(G)) 1 \leq k \leq N$$

where G is the original WCMP group, G' is the skinny WCMP group with a throughput degradation below the threshold value, N is the number of members in WCMP group G, k is a member port, and $\delta_k$ is a maximum amount of traffic to be scheduled over member port k.

17. A system, comprising:
at least one first stage network device, wherein each of the at least one first stage devices including a forwarding table; and
a plurality of second stage network devices,
wherein each of the at least one first stage network devices includes a plurality of ports, each port being linked to at least one of the plurality of second stage network devices and having an assigned weight stored in the forwarding table for distribution of flows to the plurality of second stage network devices, wherein the assigned weights are determined by:
determining a distribution of assigned weights among the ports that would result in maximum potential throughput of the flows;
determining a minimum desired throughput; and
determining a reduced set of assigned weights, such that a throughput resulting from the reduced set of assigned weights exceeds the minimum desired throughput.

18. The system of claim 17, wherein the first and second stage network devices are switches.

19. The system of claim 17, wherein each of the at least one first stage network devices further comprises a processor, wherein the processor determines the assigned weights for each of the plurality of ports.

20. The system of claim 17, wherein determining the reduced set of assigned weights comprises:
 reducing the assigned weights to an equal distribution;
 computing the throughput corresponding to the equal distribution; and
 determining whether the computed throughput exceeds the minimum desired throughput.

21. The system of claim 20, wherein if the computed throughput exceeds the minimum desired throughput, the equal distribution is used as the reduced set of assigned weights.

22. The system of claim 20, wherein if the computed throughput exceeds the minimum desired throughput, the equal distribution of assigned weights is iteratively increased until the computed throughput exceeds the minimum desired throughput.

* * * * *